(12) United States Patent
Everitt et al.

(10) Patent No.: US 7,014,198 B2
(45) Date of Patent: Mar. 21, 2006

(54) LOW PROFILE CART AND AUTOMATIC UNLOADING SYSTEM

(75) Inventors: John H. Everitt, Palmerton, PA (US); Michael L. Happel, Easton, PA (US)

(73) Assignee: Paragon Technologies, Inc., Easton, PA (US)

( * ) Notice: Subject to any disclaimer, the term of this patent is extended or adjusted under 35 U.S.C. 154(b) by 215 days.

(21) Appl. No.: 10/383,331

(22) Filed: Mar. 7, 2003

(65) Prior Publication Data

US 2003/0214106 A1   Nov. 20, 2003

Related U.S. Application Data

(60) Provisional application No. 60/381,853, filed on May 20, 2002.

(51) Int. Cl.
*B62B 3/04* (2006.01)

(52) U.S. Cl. .................................. 280/47.34; 280/79.4

(58) Field of Classification Search ............. 280/47.34, 280/33.998, 79.4, 79.6, 47.19, 47.35, 639, 280/651, 656; 105/26.05
See application file for complete search history.

(56) References Cited

U.S. PATENT DOCUMENTS

| | | | | |
|---|---|---|---|---|
| 1,374,379 A | * | 4/1921 | Klein ......................... | 280/47.2 |
| 1,789,391 A | * | 1/1931 | De Forest ................... | 254/3 R |
| 2,078,217 A | * | 4/1937 | Best .......................... | 280/47.34 |
| 2,392,409 A | * | 1/1946 | Ray ........................... | 414/429 |
| D146,784 S | * | 5/1947 | Best ........................... | D34/17 |
| 2,543,276 A | * | 2/1951 | Buechler .................... | 414/428 |
| 2,551,483 A | * | 5/1951 | Batoe ......................... | 414/428 |
| 2,782,076 A | * | 2/1957 | Miller ........................ | 305/20 |
| 3,689,098 A | * | 9/1972 | Rubin ..................... | 280/33.998 |
| 3,926,128 A | * | 12/1975 | Zappel ..................... | 105/26.05 |
| 5,029,665 A | * | 7/1991 | Harada ....................... | 180/198 |
| 5,083,804 A | * | 1/1992 | Miyashita et al. ........ | 280/47.34 |
| 5,362,194 A | * | 11/1994 | Kassebaum ................. | 414/427 |
| 5,484,150 A | * | 1/1996 | Yasutomi ................... | 280/79.3 |
| 5,505,578 A | * | 4/1996 | Fuller ........................ | 414/427 |
| 5,722,453 A | * | 3/1998 | Huxhold ................ | 137/355.28 |
| 5,746,282 A | * | 5/1998 | Fujiwara et al. ............ | 180/6.2 |
| 6,102,645 A | * | 8/2000 | Kooima et al. ............. | 414/537 |
| 6,131,214 A | * | 10/2000 | Moenning et al. ......... | 5/81.1 C |
| 6,789,994 B1 | * | 9/2004 | Tortellier .................... | 414/429 |
| 6,860,493 B1 | * | 3/2005 | Orozco ................... | 280/33.991 |

* cited by examiner

*Primary Examiner*—J. Allen Shriver
(74) *Attorney, Agent, or Firm*—Drinker Biddle & Reath LLP

(57) ABSTRACT

A low profile cart and conveyance system is disclosed. The cart includes a frame with a longitudinal axis that extends from its front to back. A plurality of wheels are mounted so as to permit movement of the cart in a direction generally along the longitudinal axis. A plurality of rollers are mounted between at least two crossbars such that the rollers' axes of rotation are substantially parallel to the longitudinal axis. The cart is preferably used as part of a conveyance system. The system also includes an ejection mechanism which is mounted at a removal station. The ejection mechanism includes a pusher assembly and a housing. The pusher assembly is adapted to extend toward the cart and push items that are on the cart along the rollers.

15 Claims, 8 Drawing Sheets

LOW PROFILE CART AND AUTOMATIC UNLOADING SYSTEM

RELATED APPLICATION

This application is related to and claims priority from U.S. Provisional Application Ser. No. 60/381,853, filed May 20, 2002, which is incorporated herein by reference in its entirety.

FIELD OF THE INVENTION

The present invention relates to carts for conveyance systems and, more particularly, to a low profile cart and automatic system for unloading such a cart.

BACKGROUND OF THE INVENTION

Many facilities use vehicles for conveying items to different locations within a facility. There are a variety of different types of vehicles that are used. For example, manually controlled vehicles, such as hand trucks and peddled vehicles; motorized driven vehicles, such as operator driven carts and forklifts; and operatorless vehicles, such as tow line carts (i.e., carts pulled to various locations with an above-ground or below-ground tow line.)

Many of these conventional vehicles require items to be manually placed on and removed from the vehicle. Also, especially with respect to operatorless vehicles, existing vehicles tend to be "off the shelf" and, thus, suited for many uses. Such vehicles tend to be bulky and, hence, difficult to store. Also, while there are some systems available for assisting in the removal of items from conventional carts, such systems are generally cumbersome and can result in damage to the goods unless properly controlled. Also, such systems cannot readily remove larger items, such as pallets, from carts. Hence, a forklift remains the single most conventional way for removing items from a cart.

A need, therefore, exists for an improved low profile cart and system for controlling removal of items contained on such a cart.

SUMMARY OF THE INVENTION

The present invention addresses the deficiencies of conventional systems by providing a low profile cart for use in a conveyance system for conveying items, such as packages. The cart includes a frame with a front, a back, two opposed sides, a top and a bottom. The frame has a longitudinal axis that extends from the front to the back. A plurality of wheels are attached to the frame and protrude from the frame's bottom. The wheels are arranged in a front set and a rear set. The wheels are mounted so as to permit movement of the cart in a direction generally along the longitudinal axis. In one embodiment, the front wheels are caster-type wheels.

At least two crossbars are mounted to and extend between the sides of the frame. The crossbars are spaced apart from one another in the longitudinal direction. A plurality of rollers are mounted between the two crossbars such that their axes of rotation are substantially parallel to the longitudinal axis. The rollers are mounted so as to protrude above the top of the frame. In one embodiment, there are three sets of rollers mounted parallel to one another.

A tow pin is preferably retractably attached to the frame so as to protrude from the bottom of the frame when not retracted. The tow pin is designed to engage with a tow line for conveying the cart.

A conveyance system is also disclosed. The conveying system includes a low profile cart as described above. The system also includes an ejection mechanism which is mounted at a removal station. The ejection mechanism includes a pusher assembly and a housing. The pusher assembly is designed to extend away from the housing and toward the cart when the cart is located at the removal station. The pusher assembly is positioned such that, upon extension, it passes above the top of the frame so that it pushes items that are stacked on the cart along the rollers. The ejection mechanism preferably includes a pneumatic actuator, and the pusher assembly preferably is a scissor linkage assembly which is controlled by the actuator.

In one embodiment the conveyance system further includes a system controller which is in communication with the ejection mechanism. The system controller controls actuation of the pusher assembly upon indication of a cart being positioned at the removal station.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DISCUSSION OF THE DRAWINGS

Figure 2:
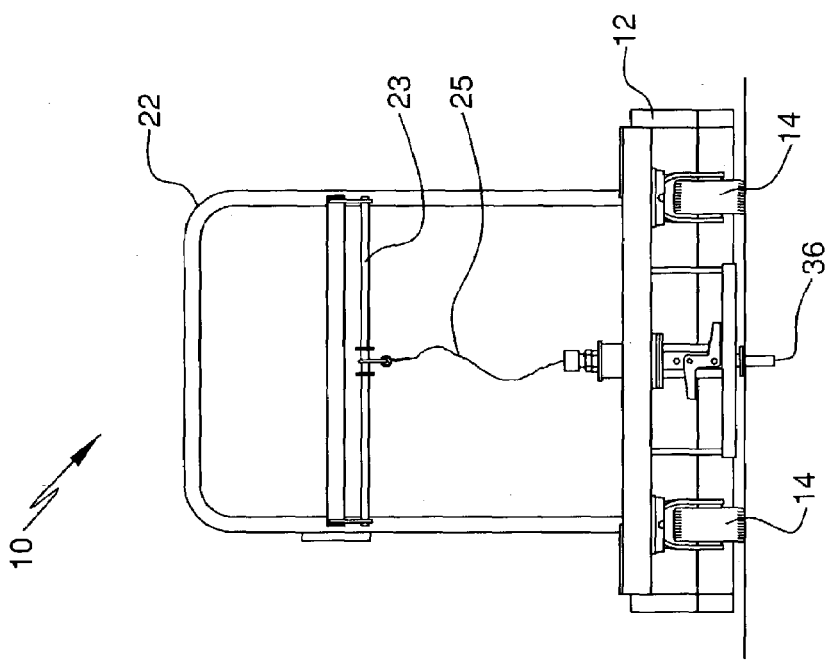
FIG. 2 is a front view of the low profile cart of FIG. 1.

Referring to the drawings, wherein like reference numerals illustrate corresponding or similar elements throughout the several views, a cart 10 is shown for transporting pallets and other storage devices, such as crates, boxes, etc. The cart includes a frame 12 with wheels 14, 16 mounted at opposite sides of the frame. The preferred frame 12 is about 43 inches wide, 69 inches long and has a height of about 3 inches. Preferably, the frame 12 is made from tubular metal, such as steel or aluminum welded or otherwise attached to form the frame. In the illustrated embodiment, there are pairs of wheels mounted to the front (14) and back (16) of the frame 12. Each pair of wheels is mounted to the frame 12 so as to protrude from or extend below the bottom of the frame 12. The wheels are preferably made from polyurethane with a 6 inch diameter and a width (face) of between 2 to 3 inches or more. Since the preferred embodiment of the invention is directed to a low profile cart, the wheels 14, 16 may protrude above the top of the frame 12. In such a case, in order to prevent injury and jamming, the upper portion of the wheels 14, 16 may be surrounded by a housing 18, 20. The wheels 14, 16 are mounted to the frame such that the bottom of the frame is about 1 inch off the ground.

Preferably, the front wheels 14 are mounted to supports 13 that form part of or are attached to the frame 12. The front wheels 14 are preferably swivel caster-type wheels that permit rotation of the wheels 16 about their own axis, as well as pivoting of the wheel assembly about a vertical axis. The rear wheels 16, on the other hand, are preferably fixed mounted to as to rotate only about the wheel's axis of rotation. However, depending on the intended use for the cart, the rear wheels can also be swivel caster-type wheels and/or the front wheels can be fixed.

The cart optionally includes a removable rack 22 that is attached to the frame 12. The rack 22 is preferably made from tubular steel or aluminum. The rack 22 engages with one or more slots or holes formed in the frame 12. In the illustrated embodiment, the rack 22 is generally shaped as an inverted U, with the lower ends sliding into spaced apart holes formed in the frame 12. The shape of the rack 22 is preferably designed so as to permit the rack 22 to be stored on or within the frame when not in use.

A swing-lift handle 23 is mounted to the frame 12. The swing-lift handle 23 is pivotally attached to the rack 22, preferably on the side elements of the rack 22. A quick disconnect cable 25 is attached to the swing-lift handle 23. Pivoting of the swing-lift handle 23 about its offset axis causes the quick disconnect cable to become taut as will be discussed in more detail below.

Figure 3:
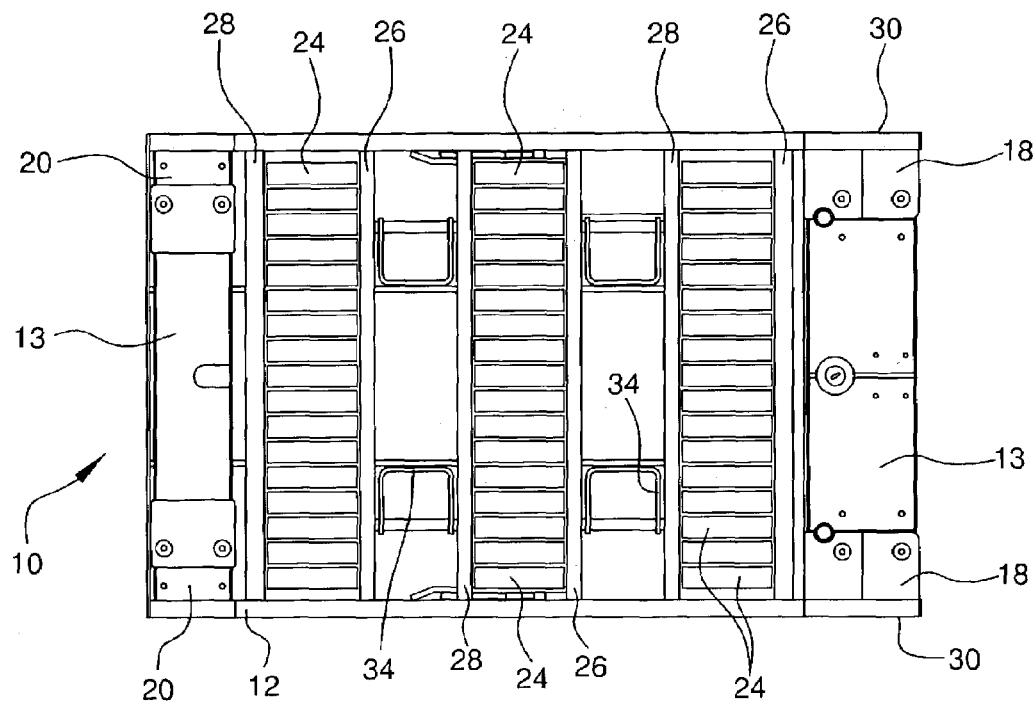
FIG. 3 is a top view of the low profile cart of FIG. 1.
Figure 4:
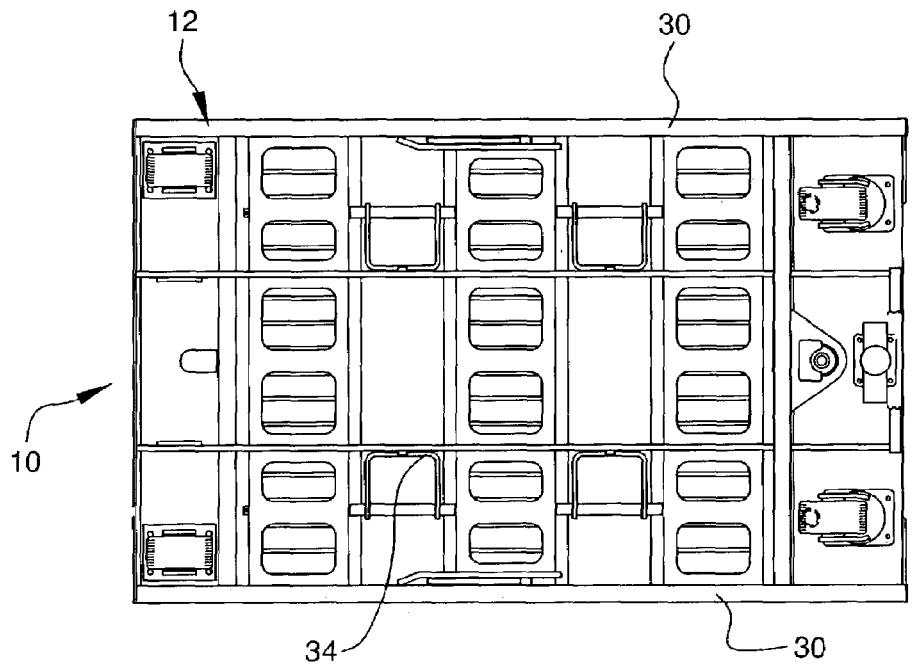
FIG. 4 is a bottom view of the low profile cart of FIG. 1.

Referring to FIGS. 3 and 4, a top and bottom view of the cart 10 is shown. The cart includes at least one and, more preferably, at least three sets of rollers 24. Each set of rollers including a plurality of rollers 24 rotatably mounted adjacent to one another in a row so as to define a rolling path from one lateral side of the frame 12 to the other. The rollers 24 are preferably eight inches wide with an approximately 2 inch diameter. The rollers 24 are mounted so as to be approximately on 2¼ inch centers. The size and spacing of the rollers, of course, may vary depending on the intended use of the cart. The rollers 24 can be made from any suitable material. In the preferred embodiment, the rollers 24 are made from steel. The rollers may be coated to increase friction, reduce wear and/or minimize noise. A person skilled in the art would readily be capable of selecting an appropriate coating should one be necessary.

As shown, the sets of rollers 24 are mounted to as to be parallel and spaced apart from one another. More specifically, the rows of rollers 24 are mounted so as to be located on approximately 10½ inch centers with respect to one another, with the forward and rear rows (i.e., end rows) being located approximately 7 inches from the wheel housings 18, 20. This spacing of the rollers 24 is particularly well suited from receiving a pallet, such as those conventionally used in the United States Postal Service. The size and mounting of the rollers is such that the frame and roller combination preferably has a total height of approximately 4¼ inches (from the floor to the top of the rollers).

Each roller 24 is mounted in and supported by a forward and aft crossbar 26, 28. The crossbars 26, 28 run across the width of the frame 12 from one side to the other. The crossbars 26, 28 preferably attached to side supports 30 on the frame 12. The rollers 24 are preferably bolted to the crossbars so as to maintain the spacing between the rollers 24.

Figure 1:
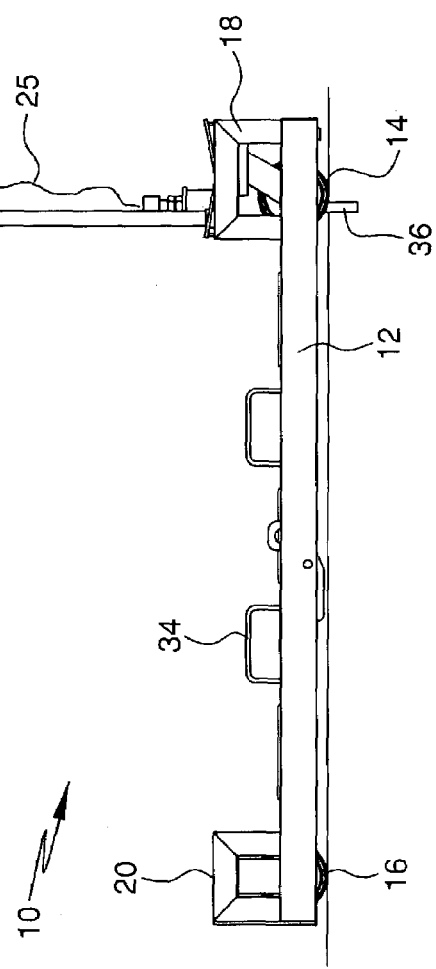
FIG. 1 is a side view of a low profile cart according to one embodiment of the present invention.

The cart 10 may also include lift lugs 34 mounted on the frame between adjacent cross bars as shown. The lift lugs are positioned and sized such that the cart may be lifted with a forklift or other lifting device and stacked for storage. The lift lugs 34 are preferably pivotally mounted to the crossbars so that the lift lugs can be swung upward when needed (as shown in FIG. 1), and swung downward for storage (As shown in FIGS. 3 and 4). When stored, the lift lugs should be below the tops of the rollers 24 so as not to interfere with items stacked on the cart 10. The ability to store the lift lugs 34 so as provide a substantially unobstructed flat surface also facilitates stacking of the carts. As such, the cart maintains a overall stack height of approximately 10¾ inches.

The cart also includes a floor lock which is designed to lock (brake) the wheels and/or cart against motion in situations where the cart is removed from the towline and placed on a floor for storage or off-line operations. Any suitable brake or lock system can be used and, thus, no further discussion is needed.

Referring back to FIGS. 1 and 2, a tow pin 36 is attached to the cart 10 and adapted to engage with a below-ground tow line conveyance system. Tow line systems are well known in the art and, therefore, no further discussion is necessary. In a preferred embodiment, the tow pin can be removed or retracted when it is desired to store the cart or otherwise not engage it with the tow line system. In one configuration of the system, the tow pin 36 is a 1⅛ inch diameter steel pin that is machined to approximately a ⅞ inch diameter for engaging with a tow line. The pin preferably extends approximately 2½ inches below the bottom of the frame 12. In the illustrated embodiment, the pin is mounted so as to reciprocate upward and downward. As discussed above, the quick disconnect cable 25 is attached to the pin 36 such that upward pivoting of the swing-lift handle 23 results in movement of the tow pin 36 upward, thus, extracting the pin from engagement with the tow line. The tow pin assembly is a weighted pin that rides in a bushing or sleeve mounted to the front of the cart. Suitable tow pins are available from Paragon Technologies, Inc., Easton, Pa.

The cart 10 may also include a load sensing device which determines and/or indicates when a load is on the cart 10. The device may be an electromechanical device, such as a pressure plate, or a mechanical linkage which is actuated when an item is placed on the cart. Such devices are well known in the art and, therefore, no further discussion is necessary.

The above cart provides a novel configuration for supporting and transporting a load. However, the cart is preferably used as part of an automated unloading system. Such a system will now be descried in more detail.

Figure 5A:
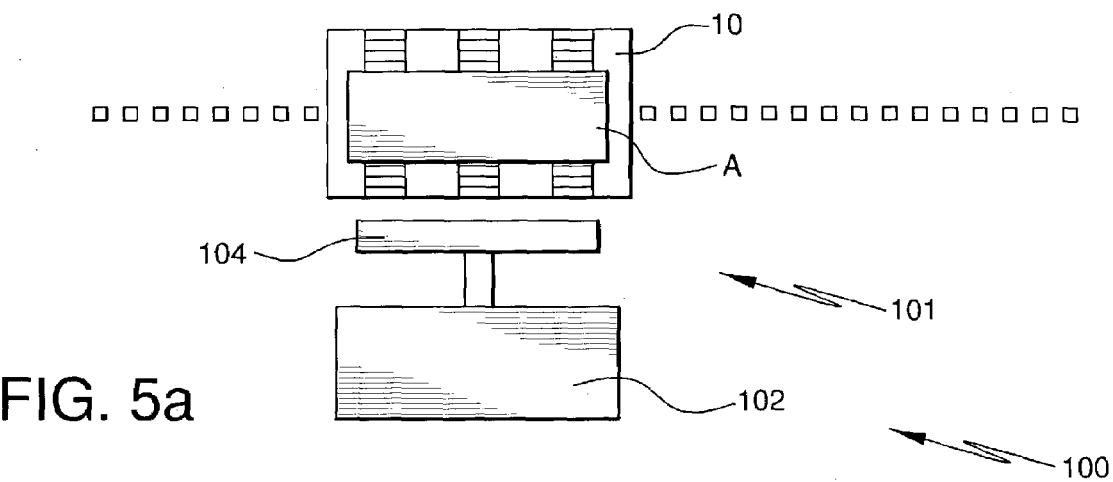
FIGS. 5a–5c are schematic representations of a system from removing items stored on a low profile cart according to the present invention.

As explained above, the cart 10 is preferably designed to engage with a tow line system for conveying the cart 10 to various locations. The present invention also contemplates the use of an automated system 100 for removing loads quickly and easily off of the cart 10 once it reaches a desired location. Referring to FIG. 5a, a schematic representation of a portion of the system is shown. The system 100 includes a removal or ejection station 101 to which the cart 10 is conveyed for removal of the items "A" that are located on the cart. The removal station 101 preferably includes an ejection mechanism 102 which is mounted adjacent to the path along which the cart 10 moves. In one preferred embodiment, the ejection mechanism 102 is a pneumatic pusher assembly which is designed, upon actuation, to push items horizontally along the rollers 24 of the cart 10.

Figure 5B:
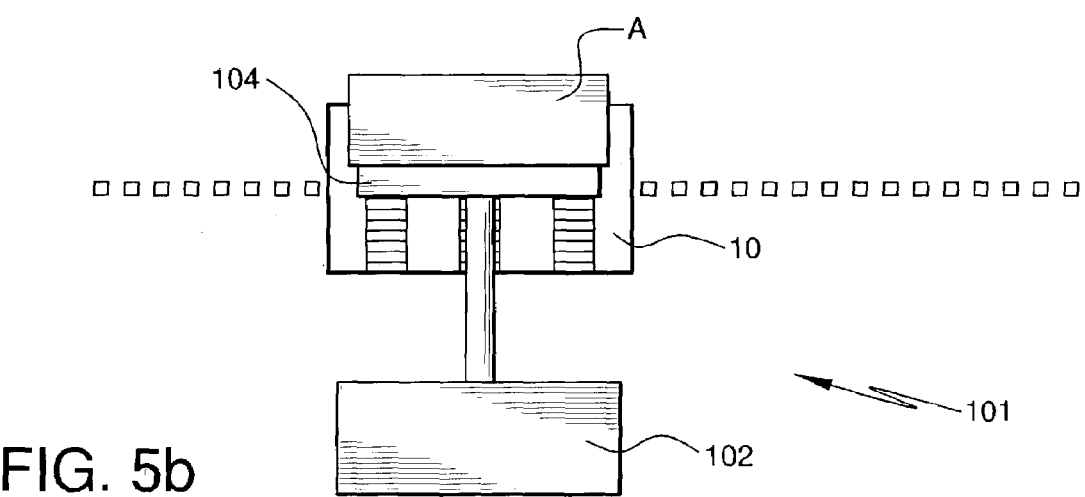
Figure 5C:
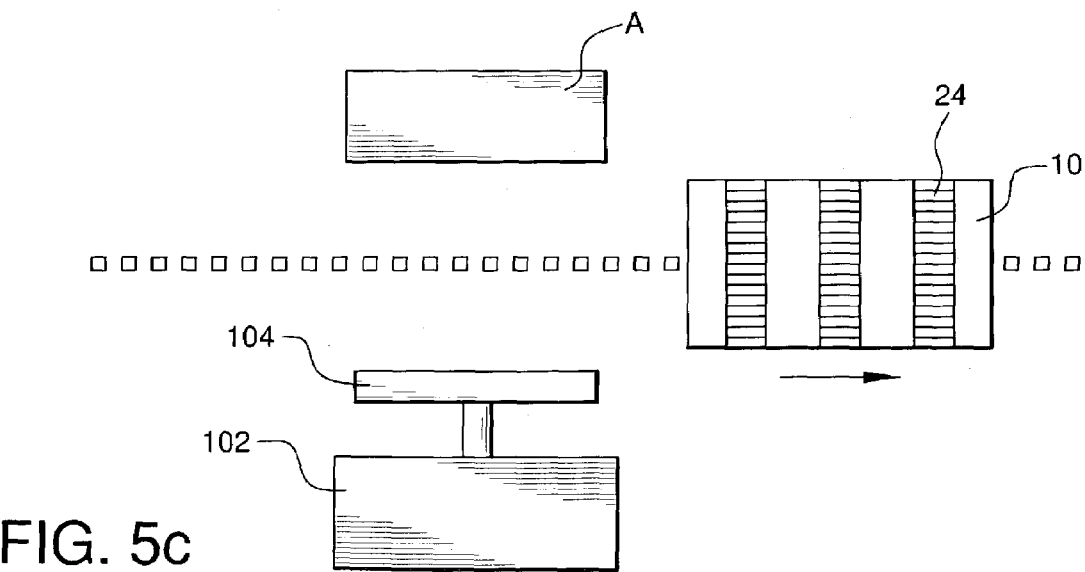

As shown in FIGS. 5a–5c, the cart is conveyed to removal station 101 (FIG. 5a) and stopped along side the ejection mechanism 102. The ejection mechanism is activated causing a pusher assembly 104 to extend toward and contact the items A situated on the cart 10 causing the items to slide along the rollers 24 (FIG. 5b). The activation may be provided by a manual control (i.e., pushbutton) or by a sensor detecting the presence of the cart at the station. The pusher assembly 104 continues to extend until the items A roll completely off of the cart into a storage bin or onto a further conveyor system, such as onto gravity rollers (not shown). After the items have been removed, the pusher assembly 104 retracts back to its initial position (FIG. 5c). The cart 10 is then free to be conveyed to its next assignment in the conveyance system.

As discussed above, the preferred embodiment uses a pneumatic ejection mechanism. Preferably the mechanism has a pusher assembly stroke of approximately 53 inches and pusher capacity of about 750 pounds. Of course, the stroke and capacity will vary depending on the design of the cart and the anticipated loads. Also, the system need not be a pneumatic system. On the contrary, any suitable mechanism which extends and retracts can be used, including hydraulic, mechanical or electromechanical mechanism. Those skilled in the art would be readily capable of selecting the appropriate ejection mechanism based on the overall system needs and requirements.

Figure 6:
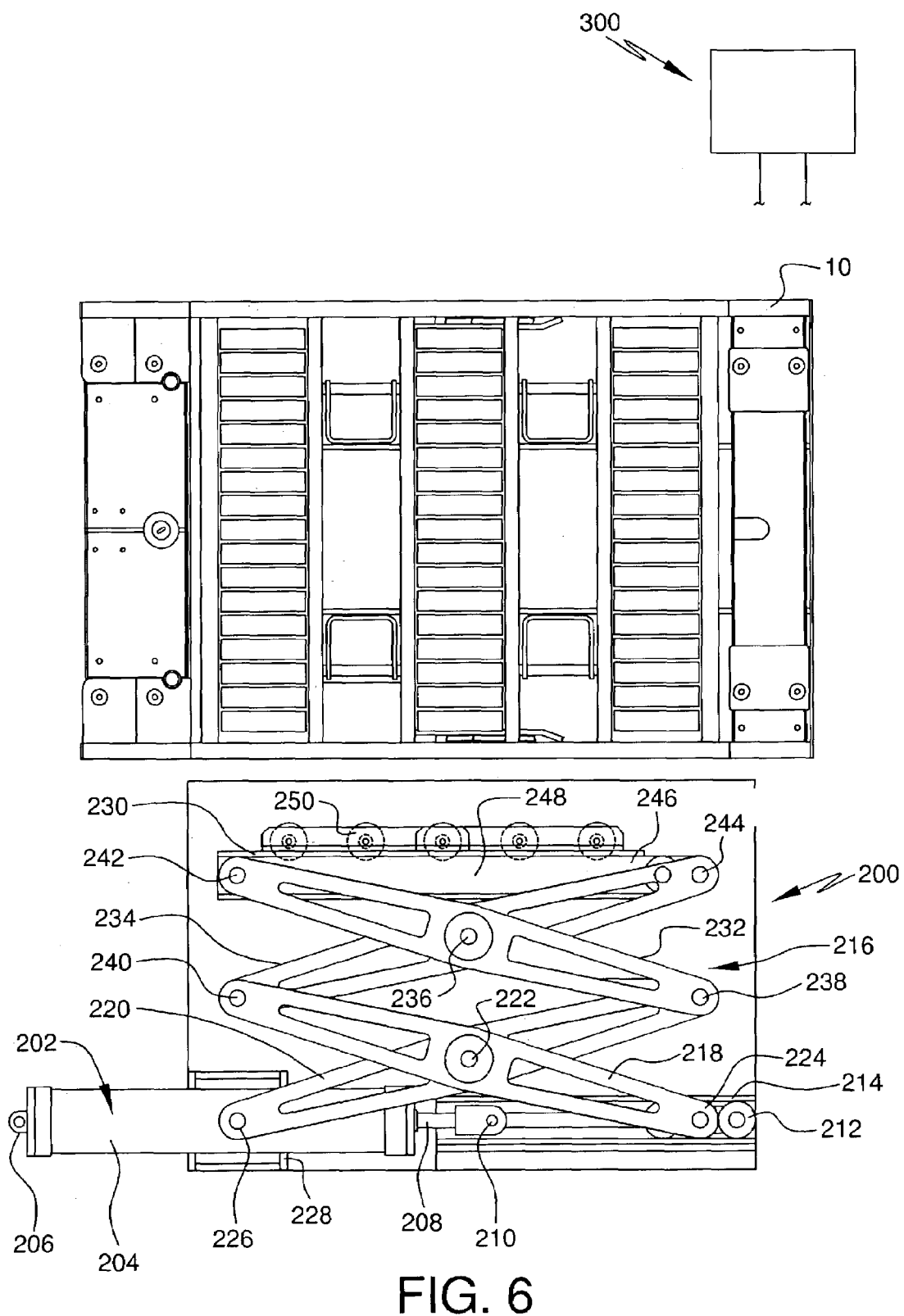
FIG. 6 is a top view of one embodiment of an ejection mechanism for use in an automated removal system for unloading items stored on a low-profile cart.
Figure 7:
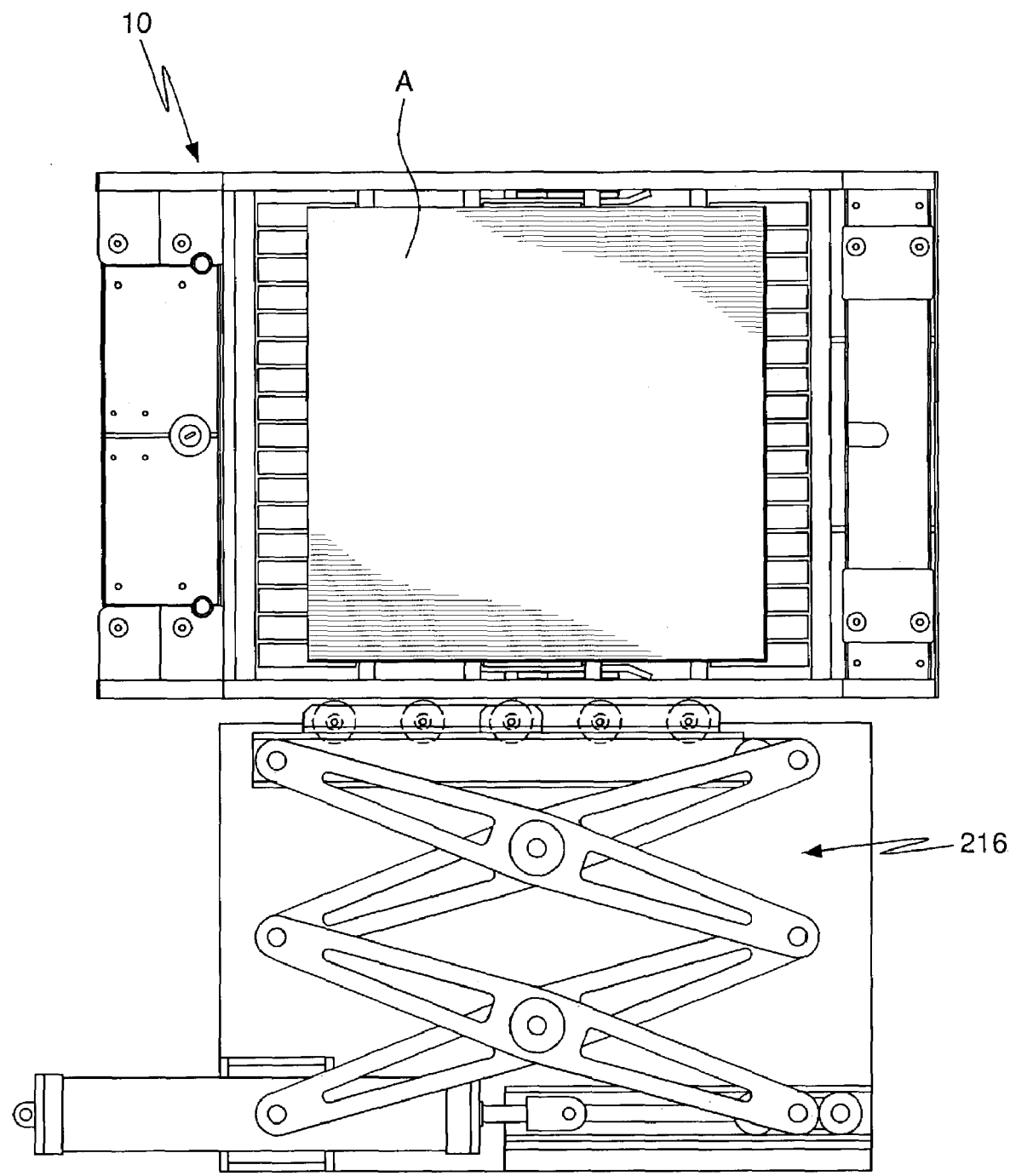
FIGS. 7–11 show the operation of one embodiment of the automatic unloading system with the low profile cart according to the present invention.
Figure 8:
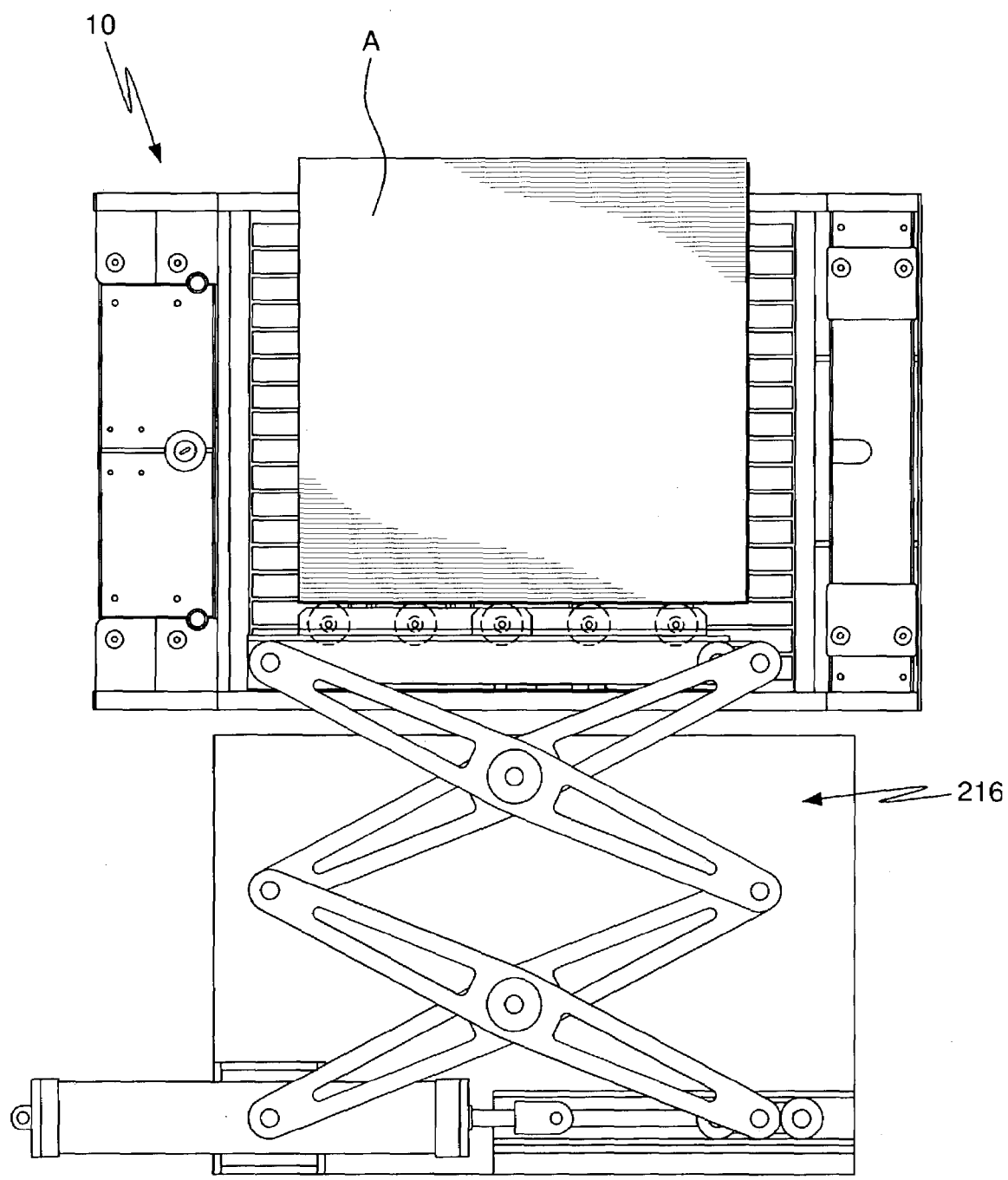
Figure 9:
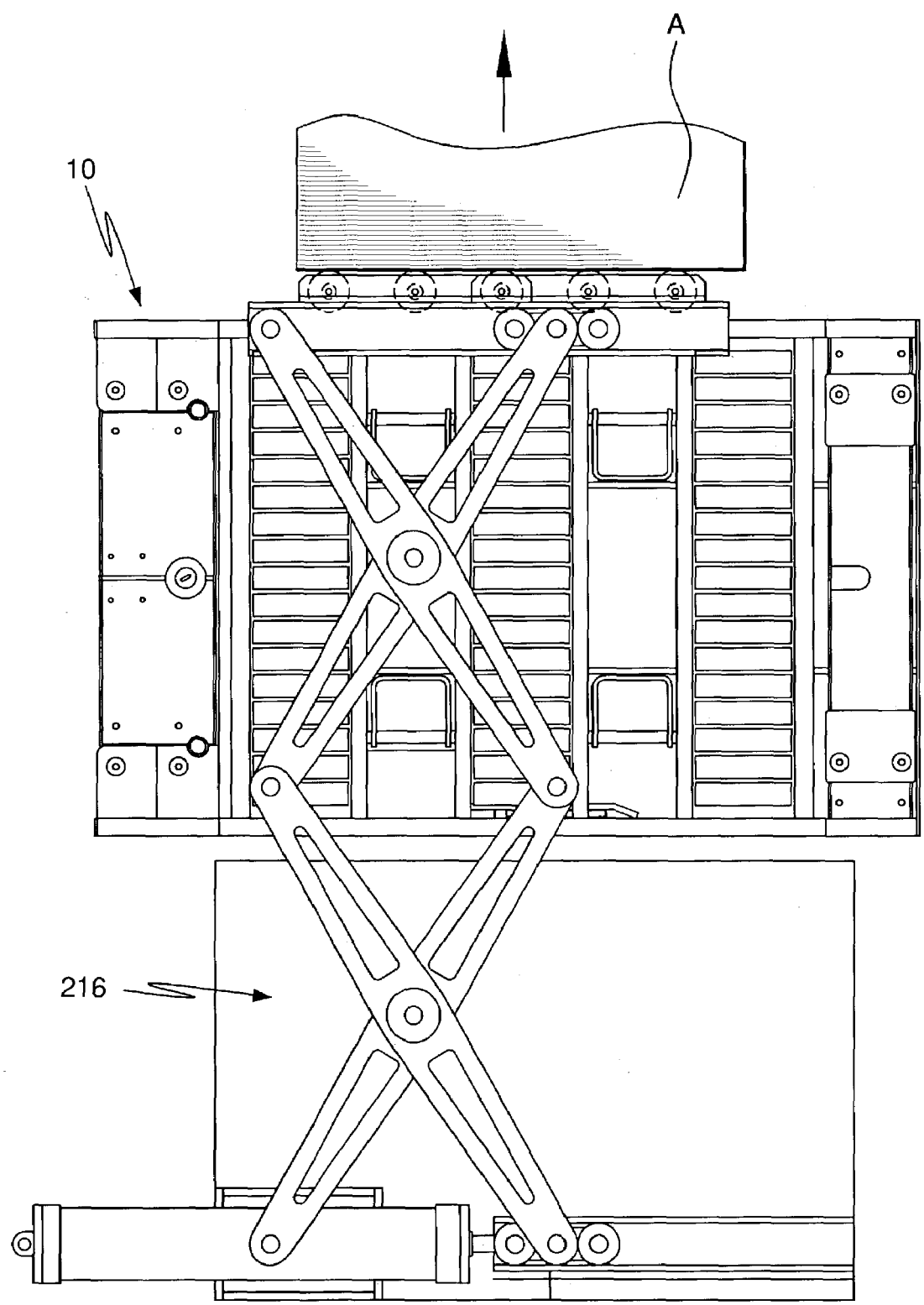
Figure 10:
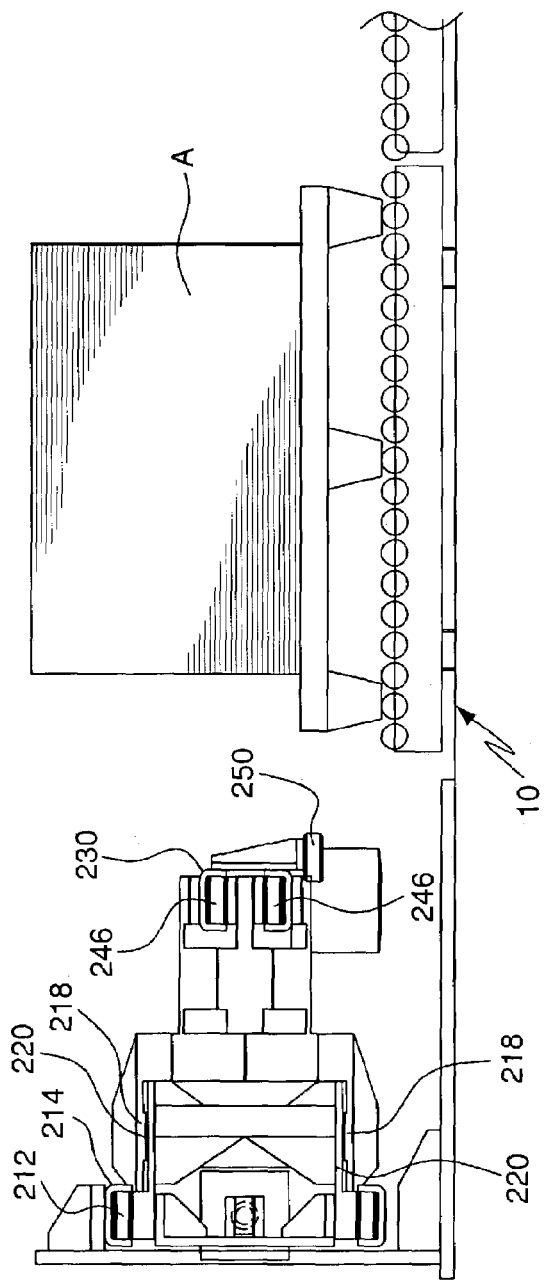
Figure 11:
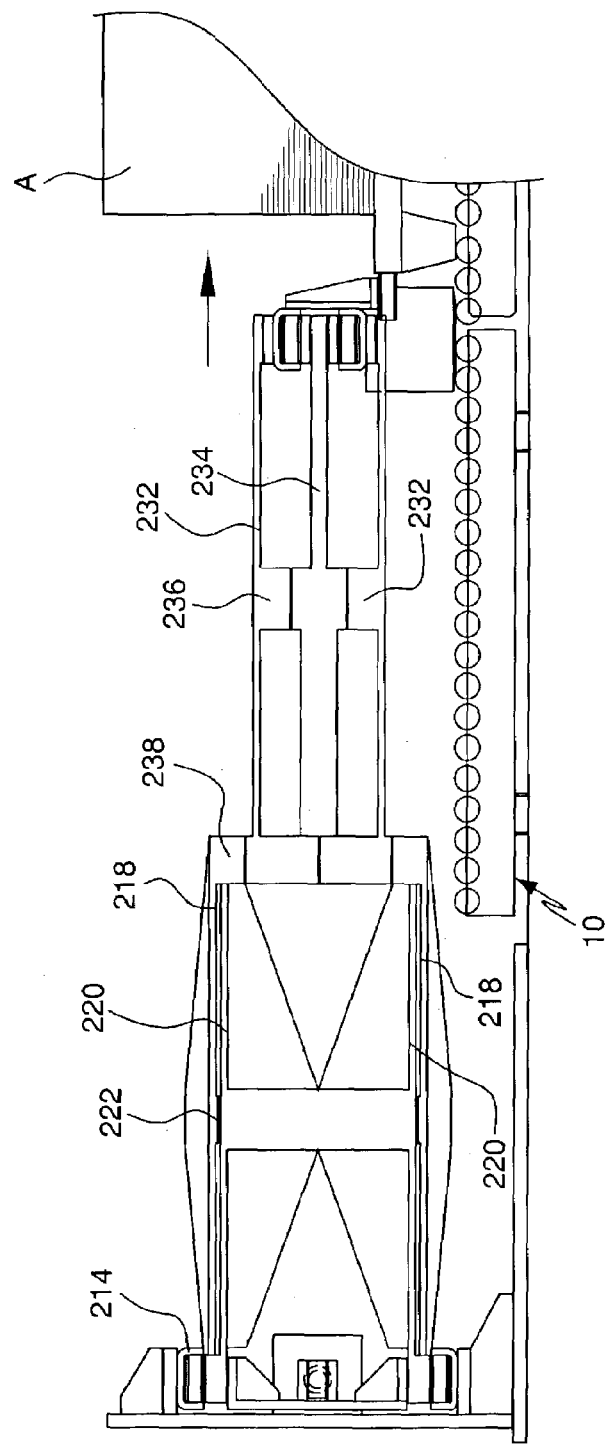

Referring to FIG. 6, a top view of one preferred ejection mechanism 200 is shown. The system includes a pneumatic actuator 202 with a housing 204 which is preferably fixed at one end 206. A shaft 208 is slidably disposed within the housing and has an outer end 210 which extends out from the housing 204. Upon actuation of the actuator 202, the shaft 208 slides laterally outward from the housing 204. The outer end 210 is engaged with a roller or slide assembly 212 which is movably disposed within a guide 214. The guide controls the motion of the roller assembly 212 to limit its movement to the lateral direction.

The pusher assembly preferably includes a scissors assembly 216 with at least first and second scissor links 218, 220. The scissor links are pivotally attached to one another at a central location 222. The first end 224 of the first scissor link 218 is pivotally attached to the roller assembly 212. The roller assembly 212 permits the first end of the first scissor link to move laterally relative to the housing. The first end 226 of the second scissor link 220 is preferably pivotally attached to a fixed frame 228 or similar fixed mounting location.

The second ends of the first and second scissor links may attach directly with a pusher support 230 in a manner as described hereinafter. However, in order to provide a sufficient amount of extension while minimizing the overall envelope of the stored linkage assembly, the preferred embodiment of the scissors assembly 216 preferably includes third and fourth scissor links 232, 234. The third and fourth scissor links are pivotally attached to one another at a central location 236. The first end 238 of the third scissor link 232 is pivotally attached to the second end of the second scissor link 220. The first end 240 of the fourth scissor link 234 is pivotally attached to the second end of the first scissor link 218. The second end 242 of the third scissor link 232 is attached to one end of the support 230. The second end 244 of the fourth scissor link 234 is engaged with a second roller or slide assembly 246 which is movably disposed within a guide channel 248 on the pusher support 230. The second roller assembly includes rollers which are attached to a roller frame. The roller frame, in turn, is attached to the second end 244 of the fourth scissor link 234. The guide channel 248 captures the rollers so as to direct their movement in a horizontal direction. The second roller assembly 246 permits that second end of the fourth scissor link 234 to translate laterally as the scissors assembly is extended and retracted.

With reference to FIGS. 7–11, the operation of the scissors assembly will now be described. When the actuator is activated, it causes the outer end 210 of the shaft 208 to reciprocate back and forth with respect to the actuator housing 204. As the shaft 208 is retracted toward the housing 204, it causes the first roller assembly 212 to slide within the guide 214 toward the housing 204. The movement of the roller assembly 212 causes the first ends of the first and second links 218, 220 to move closer to one anther. This drives the second ends of the first and second links closer to one another and further away from the housing 204. Since the first ends of the third and fourth scissor links 232, 234 are attached to the second ends of the first and second scissor links 218, 220, the result is that the second ends of the third and fourth links also move toward one another (or more correctly, the second end 244 of the fourth link 234 moves toward the second end 242 of the third link 232). The result is the translation of the pusher support 230 away from the housing 204 (i.e., extension of the ejection mechanism). Extension of the shaft 208 from the housing produces an opposite result, causing the pusher support 230 to move toward from the housing 204 (i.e., retraction of the ejection mechanism).

As shown in FIG. 6, the cart 10 is located adjacent to the pusher support 230. Accordingly, as the support 230 translates away from the actuator housing 204, it contacts whatever items are stored on the cart and slides them along the rollers 24 away from the actuator housing 204. The items may be pushed into a storage area, onto a conveyor, such as a gravity roller, or even onto another cart.

In order to facilitate contact with and movement of the items on the cart 10, the present invention may also include a plurality of contact rollers 250 mounted to the pusher support 230. The contact rollers would be positioned so as to contact the item being moved. For example, if the item being moved is a pallet, the rollers 250 the would be positioned so as to contact the side of the pallet as opposed to the items on the pallet, thus minimizing damage to the items.

The automated system also preferably includes a control system for controlling the actuation of the actuator. The control system preferably includes one or more of the following: an "Unload/Bypass" selector switch; a "Pusher Cycle" illuminated switch, a "Release Cart" illuminated switch, a "Pusher Fault Reset" illuminated switch, and an "Emergency Stop" switch. The switches are used to provide signals to and from a system controller (generally depicted by the numeral 300 in FIG. 6) which, in turn, controls activation and operation of the ejection mechanism 200. The details of the control system are best understood through a discussion of the operation of one preferred embodiment of the system.

Upon a cart 10 reaching the removal station 100, the "Unload/Bypass" selector switch is moved to the "Unload" position. This action causes the control system to inhibit carts 10 from moving from their respective accumulation stop positions. The operator then activates the "Unload Cycle" switch. Alternately, a sensor can be used to determine when a cart is positioned for unloading and automatically commence the unload cycle. Activation of the actuator causes the ejection mechanism 200 to actuate, thereby extending the pusher support 230 outward and into contact with the item on the cart 10. The pusher support 230 continues to extend until it activates a limit switch, such as a "Pusher Advanced" limit switch, or until a sensor detects that the item has been completely removed from the cart. When triggered, the limit switch (or sensor) sends a signal to the controller to stop the actuator. The controller initiates a retractions sequence which involves pausing the actuator and then retracting it to its starting position. A "Pusher Retracted" limit switch or sensor can be used to indicate when the pusher support 230 is completely retracted.

Once the unload cycle is completed the operator can release the cart by depressing a "Release Cart" switch. This action will provide a signal to the control system to release the cart 10 and advance the remaining carts forward one position. It is contemplated that, instead of operator control, the control system can automatically release the cart once the pusher support is retracted into its starting position.

An "Emergency Stop" switch can be incorporated into the system which, when depressed, purges air from ports in the actuator thereby automatically stopping further extension of the pusher support 230.

The system controller also preferably includes automatic monitoring functions to determine potential fault conditions. For example, during an unload cycle, the control system can limit the time allowed to extend or retract the pusher. If the cycle time to either extend or retract is exceeded, the cycle can be aborted, and air can automatically be purged from the ports of the actuator cylinder (thus causing automatic retraction). Also, if the pusher assembly is not retracted when a tow-pin sensor is activated, the system can again, automatically purge air from the actuator. The tow pin sensor is a switch mounted in the floor adjacent to the track. The switch is fitted with a lever positioned below floor-level but above the top of the chain. When a pusher dog with a tow pin in it passes the switch the switch contacts close, indicating to the controller that a cart is present in the station. A cart's presence may also be indicated by above-floor devices, such as photo-eyes or proximity sensors.

The low profile cart also preferably includes an identification mechanism which identifies the cart as such. This allows the low profile cart to be used in a conventional conveyance system. A system controller would detect that the cart is a low profile cart, and control its progress through the system so that the cart can be conveyed to the automated unloading system discussed above, while other, non-low profile carts may be conveyed to other types of unloading systems.

The cart discussed above provides a new and versatile conveyance mechanism for use in many different environments. The ability to stack the carts in a relatively small area makes them especially beneficial in today's work establishments. The control system described above also provides a new and innovative technique for unloading (and loading) a low-profile cart and allows for relatively easy automation of an unloading system.

Accordingly, although the invention has been described and illustrated with respect to the exemplary embodiments thereof, it should be understood by those skilled in the art that the foregoing and various other changes, omissions and additions may be made therein and thereto, without parting from the spirit and scope of the claims.

What is claimed is:

1. A low profile cart for a conveyance system, the cart comprising:
    a frame having a front, a back, two opposed sides, a top and a bottom, the frame having a longitudinal axis extending from the front to the back;
    a plurality of wheels attached to the frame and protruding from the frame's bottom, the wheels adapted to permit movement of the cart in a direction generally along the longitudinal axis;
    at least two crossbars extending between the two sides and being spaced apart from one another; and
    a plurality of rollers, each having an axis of rotation, the rollers being rotatably mounted at their axes of rotation between the two crossbars at fixed locations with respect to the cart such that their axes of rotation are substantially parallel to the longitudinal axis and such that the tops of the rollers protrude above the top of the frame, the rollers arranged into at least one set of rollers, the set of rollers including a plurality of the rollers parallel to each other and spaced apart from each other to functionally define a substantially level conveying surface in between the opposed sides of the frame for conveying an item across the top of the frame.

2. A low profile cart according to claim 1 wherein there the plurality of rollers are arranged in three sets, the sets being parallel to one another, and wherein the rollers in each set are attached to adjacent crossbars.

3. A low profile cart according to claim 1 further comprising a rack removably attached to the frame and extending upward from the top of the frame.

4. A low profile cart according to claim 1 further comprising a tow pin engaged with the frame and protruding downward past the bottom of the frame.

5. A low profile cart according to claim 1 further comprising a plurality of lift lugs mounted on the frame.

6. A low profile cart according to claim 1 wherein the plurality of wheels includes at least a front set of wheels and a rear set of wheels, and wherein at least one set of either the front or rear sets of wheels includes caster-type wheels.

7. A low profile cart according to claim 1 further comprising a load sensor for detecting when a load is on the cart.

8. A low profile cart according to claim 1 wherein the conveyance system includes an ejection mechanism mounted at a removal station, the ejection mechanism including a pusher assembly and a housing, the pusher assembly adapted to extend away from the housing and toward the cart when the cart is located at the removal station, and wherein the rollers on the low profile cart are mounted to the frame at a position that permits the pusher assembly to extend over the top of the rollers for removing items located on the rollers.

9. A low profile cart according to claim 8 wherein the conveyance system further comprises a system controller in communication with the ejection mechanism, the system controller controlling actuation of the pusher assembly upon indication of a cart being positioned at the removal station.

10. A low profile cart according to claim 8 wherein the ejection mechanism includes an actuator and wherein the pusher assembly includes a scissors assembly, the actuator controlling the scissoring of the assembly.

11. A low profile cart according to claim 10 wherein the scissors assembly includes at least first and second scissor links pivotally connected to one another, one scissor link being pivotally attached to a housing, the other scissor link being pivotally attached to a roller assembly disposed within a guide and attached to the actuator.

12. A low profile cart for a conveyance system, the cart comprising:
    a frame having a front, a back, two opposed sides, a top and a bottom, the frame having a longitudinal axis extending from the front to the back;

a plurality of wheels attached to the frame and protruding from the frame's bottom, the wheels adapted to permit movement of the cart in a direction generally along the longitudinal axis;

at least two crossbars extending between the two sides and being spaced apart from one another;

a plurality of rollers, each having an axis of rotation, the rollers being mounted between the two crossbars such that their axes of rotation are substantially parallel to the longitudinal axis and such that the tops of the rollers protrude above the top of the frame;

a tow pin engaged with the frame and protruding downward past the bottom of the frame; and a quick disconnect mechanism attached to the tow pin, the quick disconnect mechanism adapted to retract the tow pin when activated.

13. A low profile cart according to claim 12 wherein the quick disconnect mechanism includes a cable attached to the tow pin and a pivotable handle attached to the cart, pivoting of the handle causing the tow pin to move upward.

14. A low profile cart for a conveyance system, the cart comprising:

a frame having a front, a back, two opposed sides, a top and a bottom, the frame having a longitudinal axis extending from the front to the back;

a plurality of wheels attached to the frame and protruding from the frame's bottom, the wheels adapted to permit movement of the cart in a direction generally along the longitudinal axis;

at least two crossbars extending between the two sides and being spaced apart from one another;

a plurality of rollers, each having an axis of rotation, the rollers being mounted between the two crossbars such that their axes of rotation are substantially parallel to the longitudinal axis and such that the tops of the rollers protrude above the top of the frame; and a plurality of lift tugs mounted on the frame, the lift tugs pivotally mounted between adjacent crossbars.

15. A low profile cart for a conveyance system, the cart comprising:

a frame having a front, a back, two opposed sides, a top and a bottom, the frame having a longitudinal axis extending from the front to the back;

a plurality of wheels attached to the frame and protruding from the frame's bottom, the wheels adapted to permit movement of the cart in a direction generally along the longitudinal axis, the plurality of wheels including at least a front set of wheels and a rear set of wheels, and wherein at least one set of either the front or rear sets of wheels includes caster-type wheels at least two crossbars extending between the two sides and being spaced apart from one another;

a plurality of rollers, each having an axis of rotation, the rollers being rotatably mounted at their axes of rotation between the two crossbars at fixed locations with respect to the cart such that their axes of rotation are substantially parallel to the longitudinal axis and such that the tops of the rollers protrude above the top of the frame; and a tow pin on the frame and protruding downward past the bottom of the frame, the tow pin being movable in a generally upward direction, the rollers arranged into at least one set of rollers, the set of rollers including a plurality of the rollers arranged parallel to and spaced apart from each other to functionally define a substantially level conveying surface in between the opposed sides of the frame for conveying an item across the top of the frame.

* * * * *